Nov. 30, 1954  H. J. TALGE ET AL  2,695,644
FOOD GRINDER HAVING RELEASABLE LATCH MEANS
Filed July 26, 1951
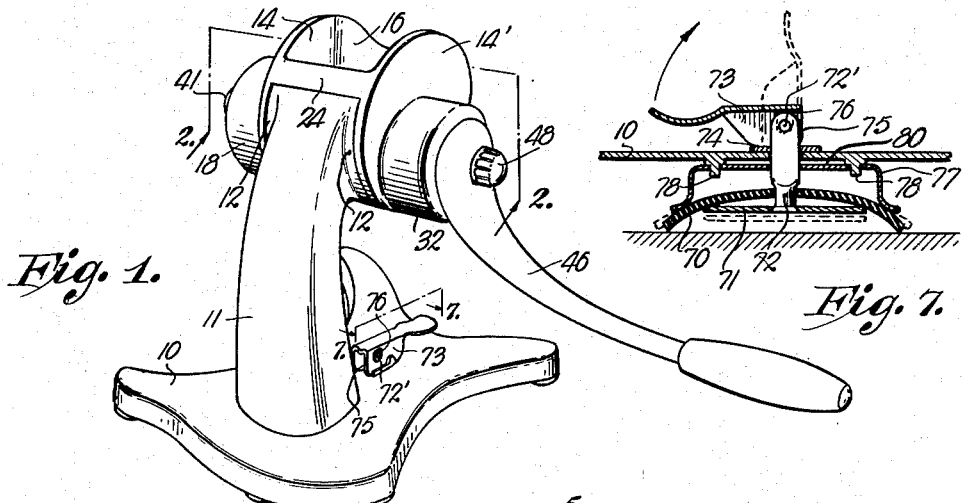
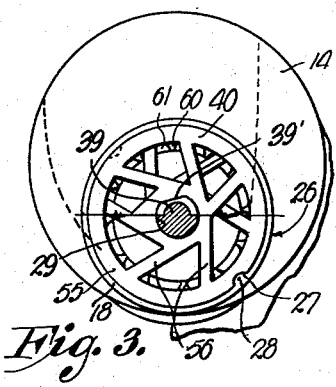
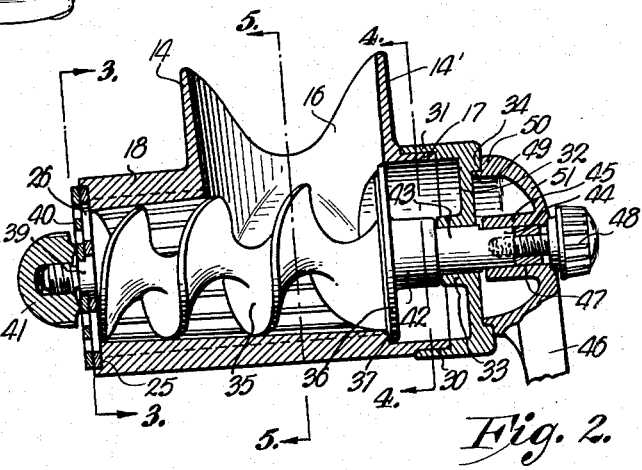
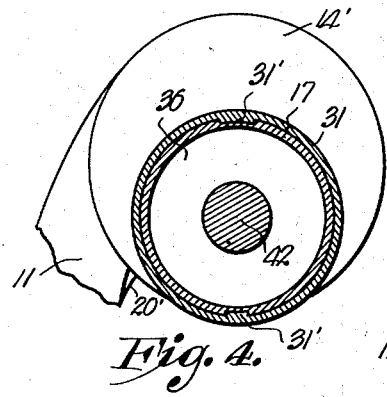
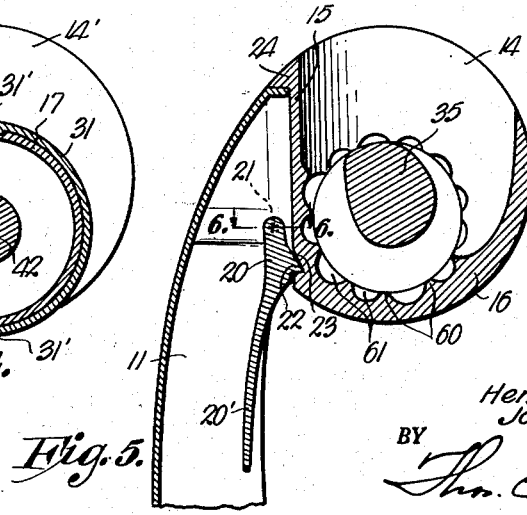
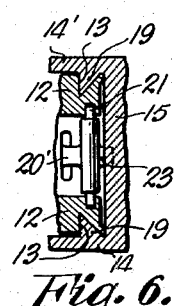
INVENTORS.
Henry J. Talge
John E. Snell
BY
Thos. E. Scofield
ATTORNEY.

United States Patent Office 2,695,644
Patented Nov. 30, 1954

2,695,644

FOOD GRINDER HAVING RELEASABLE LATCH MEANS

Henry J. Talge and John E. Snell, Kansas City, Mo., assignors to John C. Hockery, Kansas City, Mo., as trustee Application July 26, 1951, Serial No. 238,709

2 Claims. (Cl. 146—182)

This invention relates to a meat grinder and vegetable cutter of the type suited for use in the kitchen.

A principal object of this invention is to provide a meat grinder and vegetable cutter which has improved meat grinding and vegetable cutting efficiency, producing better, faster and more uniform grinding and cutting of the materials; and at the same time being operable easily and with a minimum of effort on the part of the operator, and with a high degree of safety.

Another object of this invention is to provide a meat grinder and vegetable cutter of the character described, and one which may be conditioned quickly and easily for meat grinding or for vegetable cutting and for fine cutting or coarse cutting.

Another object of the invention is to provide a meat grinder and vegetable cutter of the character described, having few parts so assembled that they can be assembled and disassembled quickly, easily and safely, and which parts are sturdy, durable and highly resistant to rusting, discoloration and deterioration. A further object is to provide a grinder whose parts, when disassembled, are of a character which facilitates cleaning thereof.

Another object of this invention is to provide a meat grinder and vegetable cutter of the character described and one which is light in weight, is easily portable and is attractive in appearance.

A further object of this invention is to provide a meat grinder and vegetable cutter of the character described with releasable anchoring means whereby the grinder and cutter may be anchored tightly and firmly to the flat top of a table, counter, shelf or the like, giving the device great stability and which means are operable manually easily and quickly to anchor or to release the device.

Other objects of this invention will be in part obvious and in part pointed out hereinafter.

Broadly stated, a meat grinder and vegetable chopper embodying this invention includes a standard supported on a suitable base, a hopper releasably latched on the standard, a feed screw with operating handle therefor removably disposed in the hopper for rearward removal therefrom together, a set of meat grinding and vegetable cutting disks removably, interchangeably and reversibly attachable to the feed screw at its discharge end and co-operable with a grinding and cutting disk fixed on the hopper at its outlet, and, preferably, manually operable means on the base for releasably anchoring the base to the flat top of a support.

The invention accordingly consists in the features of construction, combinations of elements and arrangement of parts which will be more fully described hereinafter and the scope of the application of which will be pointed out in the claims that follow.

In order that a clearer understanding of this invention may be had, attention is hereby directed to the accompanying drawings, forming a part of this application and illustrating certain possible embodiments of this invention, and in which:

Fig. 1 is a perspective view of a meat grinder and vegetable cutter embodying this invention, Fig. 2 is an enlarged vertical sectional view thereof through the hopper with the feed screw therein, and is taken on the line 2—2 indicated in Fig. 1, Fig. 3 is a sectional view at the discharge end and is taken on the line 3—3 of Fig. 2, Fig. 4 is a sectional view at the handle end and is taken on the line 4—4 of Fig. 2, Fig. 5 is a central sectional view and is taken on the line 5—5 of Fig. 2, Fig. 6 is a sectional view of a fragment of the device and shows the hopper latch, the view being taken on the line 6—6 of Fig. 5, and Fig. 7 is an enlarged fragmentary cross sectional view taken along the line 7—7 of Fig. 1.

Similar reference characters refer to similar parts throughout the several views of the drawings.

Referring to the drawings, the meat grinder and vegetable cutter, as shown in the drawings for the purpose of illustrating one possible embodiment of this invention, includes a base 10 carrying an upright standard 11 which may be of channel shape in cross-section with substantially parallel sidewalls and has its top curved toward the horizontal so as to present its top opening in a generally horizontal direction. About this opening the sides of the standard are widened as at 12 and in the outer side surface of each of these widened portions is a vertical groove or guideway 13 (see Fig. 6) adapted to receive complementary ribs or tongues 19 of a removable hopper as will now be explained.

The hopper is shown as an integral piece formed with two spaced, upright disk-like portions 14 and 14' joined together adjacent their rear edges by a vertical wall portion 15 and by a wall portion 16 curving from the bottom of portion 15 along the bottoms and part way up the forward edges of the disks 14, 14', thus forming between disks 14, 14' and the wall portions 15 and 16 a hopper inlet for the introduction into the hopper of material to be operated upon by the grinder and cutter. An integral annular hub portion 17 extends rearwardly of the rear disk 14' and an integral hub portion 18 extends forwardly of the forward disk 14, the curved bottom edges of the hubs 17 and 18 aligning with the curved bottom edges of the disks 14, 14' and connecting wall 16, thus giving the hopper a most attractive appearance, particularly when associated with the graceful goose-neck shape of standard and pleasingly contoured base 10.

Rearwardly of the wall portion 15 of the hopper the disks 14, 14' thereof are formed with vertical ribs 19 which respectively are slidable vertically into and out of the respective grooves 13 of the standard to removably mount the hopper on the standard. A finger latch 20 is pivotally mounted on a pin 21 carried by and bridging the widened end portions 12 of the standard and has a detent finger 22 adapted to drop into a keeper recess 23 therefor in the back wall portion 15 of the hopper and serves to automatically latch the hopper in place on the standard whenever the hopper has been slid downwardly into place on the standard; the hopper has an integral cross portion 24 presenting a shoulder which is adapted to engage and rest on the top of the standard to limit the extent of downward movement of the hopper on the standard and to locate the keeper recess 23 of the hopper in position to be engaged by said latch 20. Latch 20 has a finger lever 20' extending downwardly and readily accessible for finger manipulation by the operator to retract the latch and quickly release the hopper for upward removal from the standard. The latch 20 automatically latches the hopper in place when placed on the standard.

The front end of the hub 18 of the hopper has an annular recess 25 adapted to receive a cutter disk 26 which has one or more notches 27 on its periphery which receive projections 28 on the periphery of the recess 25 to lock the disk 26 against rotation in the recess 25 but permitting removal of the disk from the recess. This disk 26 has a central bearing hole 29 to receive the pin 39 which extends from the front end of the feed screw.

The rear end of the hub 17 of the hopper has a peripheral recess 30 which removably receives a forwardly extending annular flange 31 of a cap 32, the hub and flange having rib and groove engagement, as at 31' (Fig. 4), preventing relative rotation. The base of the cap has a journal boss 33 at its center adapted to journal a stem of the feed screw; the rear face of cap 32 also has an annular rearwardly extending peripheral shoulder 34 adapted to be engaged slidably on its inner and rear faces respectively by an annular flange 49 and a shoulder 50 presented by the hub 51 of an operating handle 46 for the feed screw.

The feed screw is adapted to be removably disposed in the hopper and has a spiral feed screw section 35 which extends from near the rear hopper disk 14' to the location of the cutter disk 26. At the rear end of the spiral section 35 is an annular radial flange 36 which is adapted to abut a stop shoulder 37 formed on the interior of the wall 16 of the hopper to limit the extent of forward movement of the feed screw into the hopper. On the front of the spiral section 35 there is a forwardly extending pin 39 adapted to project through the center hole 29 of the cutter disk 26 and through a similar hole in a second cutter disk 40 placed face to face against the cutter disk 26. Disk 40 and pin 39 have mating flat surfaces as at 39' (Fig. 3), so that disk 40 and the feed screw rotate together. The end of pin 39 protrudes from the disks and is threaded for a cap nut 41 whereby the feed screw may be clamped at one end against the disks 40 and 26. A stem extends rearwardly from the rear end of the spiral section 35 of the feed screw and has a circular boss 42 against which the center boss 33 of the cap 32 is adapted to abut endwise. Extending rearwardly from boss 42 is a circular bearing section 43 which rotatably seats in the cap boss 33, the rear end 44 of the feed screw extending rearwardly from section 43 and is adapted to have slid thereon the hub sleeve 45 of the operating handle 46; the end 44 of the feed screw has a threaded bore 47 to receive a finger screw 48 whereby the operating handle is fastened to the feed screw. Preferably the feed screw stem end 44 and the handle hub sleeve 45 have coacting flats or splines to insure of the feed screw rotating with the operating handle.

The non-rotating cutter disk 26, as shown, has an outer annular rim 55 from which six cutter spokes or ribs 56 extend from equidistant areas of the rim tangentially to the center hole 29 of the disk, the ribs meeting at their inner ends to form this hole. To cut vegetables the rib arrangement of the outer cutting disk 40 may be identical with that of the inner disk 26. By facing disk 40 so that its ribs 57 are directed in the same direction as the ribs of disk 26 coarse cutting of the vegetables will result, and by reversing the facing of the disk 40 fine cutting of the vegetables will be had. Obviously, for grinding meat a conventional meat grinding disk, usually provided with a multitude of small perforations, may easily and conveniently be substituted for the rotary vegetable cutting disk 40.

The feed screw is so shaped that it can be drawn rearwardly out of the hopper while the operating handle is still attached thereto. To permit this, no part of the feed screw has a diameter larger than the diameter of the bore of the rear sleeve 17 of the hopper. As shown, the worm section 35 of the feed screw may be tapered to decreasing diameters toward the discharge end. This tends to increase the compression of the material acted on as the material is advanced; the internal diameter of the hub 18 of the hopper being dimensioned according to the diametrical dimensions of the part of the worm operating therein. Also the bottom of the hopper may be formed to have longitudinal alternating ribs and hollows 60 and 61 (Fig. 5) to increase the efficiency of the grinding and cutting action of the feed screw and to lessen the resistance of the material to being ground or cut and thus reducing the effort required to turn operating handle 46 to do the work.

When the meat grinder and vegetable cutter is being used it should be anchored to some support so as to be stable. To this end a suction anchoring device mounted on the underside of the base 10 may be employed. Such means, as shown, may comprise a downwardly facing cup-shaped suction disk 70 of resilient, air impervious material, such as rubber or the like, with a plate 71 within the cup, the plate being fastened to the lower end of a stem 72 which extends upwardly through the center of the disk 70 and the base 10 and at its upper end is connected to a cam finger lever 73 so that the stem 72 and the plate 71 thereon may be raised and lowered. Lever 73 has a cam edge 74 which rests on the base 10 when the lever 73 is horizontal and has another cam edge 75 which rests on the base 10 when the lever is vertical. The upper end of stem 72 carries a cross pin 72' which is engaged in a hole 76 in the lever 73, this hole being eccentric to the cam edges 74 and 75 in such a way that moving the lever 73 from vertical to horizontal position raises the stem 72 and thereby raises the plate 71 and lifts the center of suction disk 70 with the result that when the center of the suction disk 70 is raised a partial vacuum is created between the disk 70 and the flat surface thereunder, causing the circumference of the disk to adhere to and be anchored to any flat surface on which the base 10 has been placed. When the finger lever 73 is then raised to vertical position the resiliency of the suction cup causes the cup to return to its more flat normal shape and the vacuum is destroyed and the vacuum bond between the cup and the support is broken. To make the vacuum action of the cup more certain and active when the center of the cup is lifted, an annular ring 77 (which may be the side wall of a cup-shaped element 80), having its lower edge resting on the cup 70 adjacent its periphery may be attached to the under side of the base 10, as by tabs or studs 78.

To condition the device for meat grinding or for coarse or fine cutting of vegetables, it is only necessary to remove the cap nut 41 and either place a conventional meat grinding disk in front of the non-rotating disk 26 or to place a vegetable cutting disk, such as 40, in front of the disk 26 faced properly for coarse or fine grinding as desired, and then replace the nut 41.

To release the parts of the device for cleaning it is only necessary to remove the same nut 41. When this nut is removed the operating disks 26 and 40 are free to be lifted out of the device and the feed screw with the operating handle 46 attached thereto and the cap 32 may be withdrawn together rearwardly out of the bore of the hopper. The hopper, with or without the feed screw, cutting disks, etc., may be unlatched from the standard 11 merely by pressing a finger against the finger lever 20' of the latch 20, whereupon the hopper is free to be lifted from the standard.

Obviously, the operating handle 46 and cap 32 become removable from the feed screw whenever the finger screw 48 is removed. When the parts are thus disassembled they may be conveniently cleaned by ordinary dishwashing methods.

It is believed to be obvious that a meat grinder and vegetable cutter constructed as above described fullfils all of the objects of this invention, stated hereinbefore, most effectively and efficiently. However, as many changes may be made in the construction and many possible embodiments of this invention may be made without departing from the scope thereof, it is understood that all matter contained in the above description or shown in the accompanying drawings is to be interpreted as illustrative and not in a limiting sense.

Having thus described our invention, we claim:

1. In a device of the character described for use as a kitchen utensil for grinding and shredding foods, in combination, an upright standard of U-shape in cross section and having a substantial vertical way in each side wall open at the top, means for shredding and grinding said foods mounted on said standard and including a hopper, the center portion of said hopper bridging the space between the side walls of said U-shaped standard and having formed therein a keeper recess, coacting stop means on said standard and said hopper adapted to stop the hopper in a predetermined lowered position on the standard, and a releasable latch pivotally mounted within and between the side walls of the standard, said latch having a depending finger lever readily accessible for finger manipulation and a detent on the latch adapted to engage the keeper recess in the center portion of the hopper when said hopper is in a predetermined lowered position.

2. In a device of the character described for use as a kitchen utensil for grinding and shredding foods, in combination, an upright standard of U-shaped in cross section and having a substantially vertical way in each side wall open at the top, means for shredding and grinding said foods mounted on said standard and including a hopper having two spaced flanges each disposed outside the respective side walls of said standard and concealing said ways, the center portion of said hopper between said flanges bridging the space between the side walls of said U-shaped standard and having formed therein a keeper recess, vertical ribs carried by said flanges conforming to and adapted to slidably run in said ways, coacting stop means on said standard and said hopper adapted to stop the hopper in a predetermined lowered position on the standard, and a releasable latch pivotally mounted within and between the side walls of the standard, said latch having a depending finger lever readily accessible for finger manipulation and a detent on the latch adapted to engage the keeper recess when said hopper is in a predetermined lowered position.

References Cited in the file of this patent

UNITED STATES PATENTS

| Number | Name | Date |
|---|---|---|
| D. 162,997 | Talge | Apr. 17, 1951 |
| 43,427 | Perry | July 5, 1864 |
| 649,770 | Snow | May 15, 1900 |
| 676,461 | Geisel | June 18, 1901 |
| 1,030,090 | Johnson | June 18, 1912 |
| 1,353,420 | Reno | Sept. 21, 1920 |
| 1,799,944 | Beardsley | Apr. 7, 1931 |
| 1,840,400 | Lebherz | Jan. 12, 1932 |
| 1,869,220 | Klod | July 26, 1932 |
| 1,918,186 | Juengst et al. | July 11, 1933 |
| 1,951,115 | Wonsowicz | Mar. 13, 1934 |
| 2,078,565 | Durst et al. | Apr. 27, 1937 |
| 2,156,025 | Paul | Apr. 25, 1939 |
| 2,202,548 | Ciarlone | May 28, 1940 |
| 2,326,996 | Fuge | Aug. 17, 1943 |
| 2,410,709 | Brooks | Nov. 5, 1946 |
| 2,538,465 | Marco | Jan. 16, 1951 |

FOREIGN PATENTS

| Number | Country | Date |
|---|---|---|
| 2,447 | Great Britain | 1913 |
| 603,894 | Great Britain | July 24, 1948 |
| 612,143 | Great Britain | Nov. 9, 1948 |